Aug. 7, 1951
H. BOOTH
2,563,451
PHOTOGRAPHIC FITTING METHOD
Filed Sept. 13, 1945
2 Sheets-Sheet 1
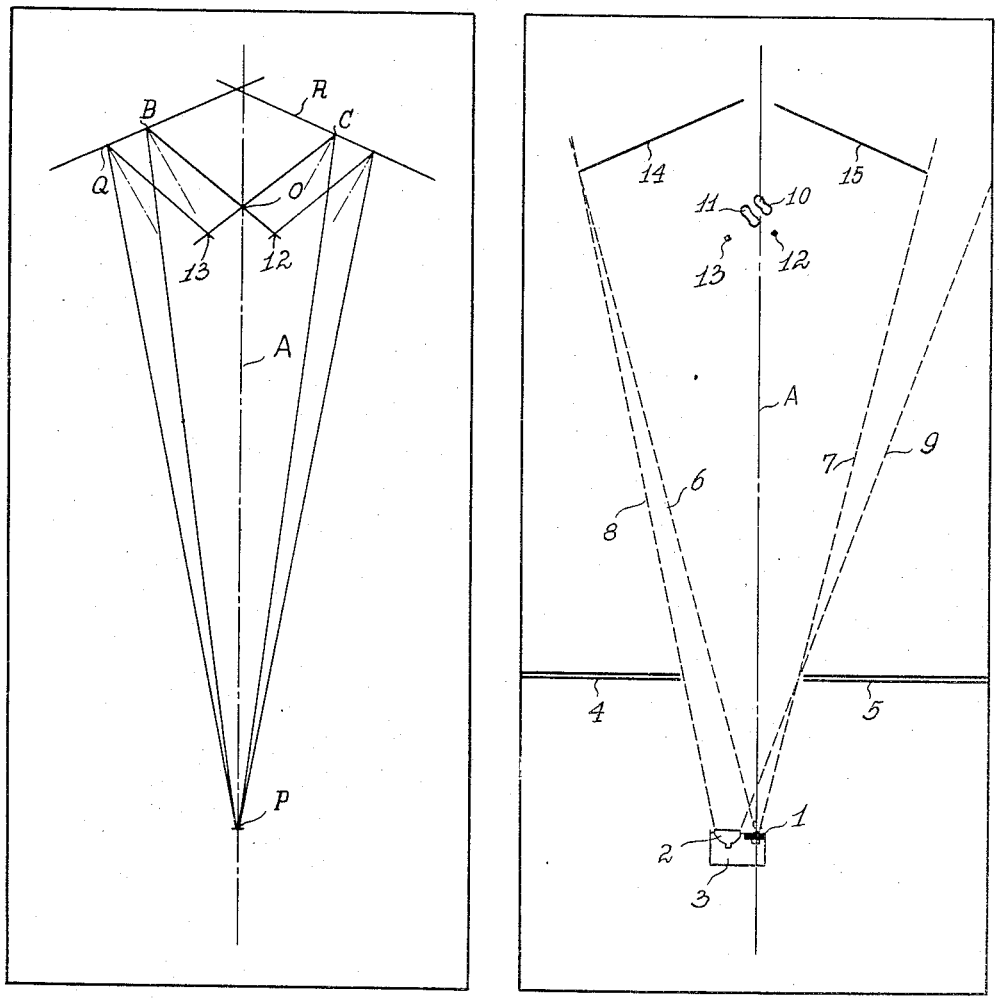
INVENTOR
HENRY BOOTH
BY
ATTORNEYS Aug. 7, 1951 H. BOOTH 2,563,451
PHOTOGRAPHIC FITTING METHOD
Filed Sept. 13, 1945 2 Sheets-Sheet 2

INVENTOR
HENRY BOOTH
BY
ATTORNEYS

Patented Aug. 7, 1951

2,563,451

UNITED STATES PATENT OFFICE 2,563,451

PHOTOGRAPHIC FITTING METHOD

Henry Booth, Bronxville, N. Y., assignor to The Henry Booth Methods Corporation, New York, N. Y., a corporation of Delaware Application September 13, 1945, Serial No. 616,117

3 Claims. (Cl. 33—17)

This invention relates to improvements in photographic apparatus and methods for fitting clothes.

The utilization of photography for obtaining measurements for the purpose of tailoring or fitting clothes has previously been proposed in a great variety of ways. Such proposals have included the use of photographs taken against, or projected against, reticulated screens or charts of various types and the use of harness of various types for indicating girth measurements or facilitating inner seam mesurements has also been proposed. Nevertheless, many of the problems presented by this type of fitting have hitherto been found unsurmountable.

It is an object of the present invention to eliminate certain difficulties in photographic fitting which arise from movement of the customer between exposures made at different angles.

Another object of the invention is to eliminate the need for multiple cameras or other complex and expensive equipment.

Another object of the invention is to facilitate girth and other difficult measurements by providing, in conjunction with photographic images with which linear measurements can be taken, one or more images from which contours may be closely estimated.

Still another object of the invention is to provide for close estimation of bodily measurements by comparison with a set of standard patterns and the establishment of detail measurements and necessary alterations by reference thereto, instead of, or in addition to, direct measurement.

In certain aspects the present invention is an improvement upon Ohlsson Patent No. 2,006,774, granted July 2, 1935, for method of obtaining measurements for making apparel to individual measurement.

With the foregoing and still other objects which will appear in the following description in mind, the invention consists in the combinations and arrangements of parts, and methods of fitting which will now first be fully described in connection with the accompanying drawing and then be more particularly pointed out in the appended claims.

The apparatus required for practicing the present invention is of extreme simplicity, and is shown in the accompanying drawing, in which:

Figure 1 is a plan view of a booth or layout by means of which the photograph or photographs of a customer are taken;

Figure 2 is a geometrical layout exhibiting certain relative dimensions and geometrical relationships of the booth of Figure 1;

Figure 3:
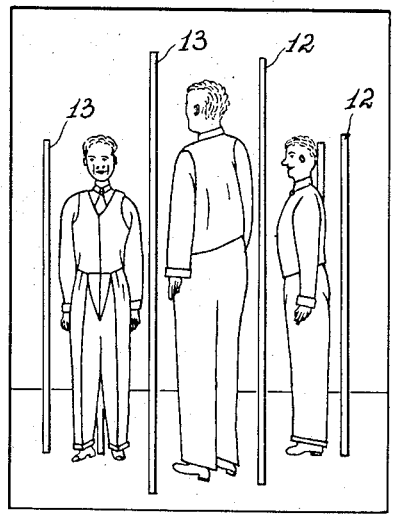
Figure 3 is a schematic view of a photographic transparency or frame of the type produced in practicing the method of the invention.

Referring now to Figure 1, a camera 1 and light 2 are utilized in making the exposure. These elements may be placed upon a fixed table 3, with the camera lens about thirty inches from the floor, and need not be moved thereafter. The light 2 preferably comprises a reflector and multiple flash bulb connected to the camera 1 by synchronizing equipment, so that unskilled personnel may readily make the exposure. The booth of Figure 1 is divided lengthwise by a pair of partitions 4 and 5 which serve to shield the camera from unwanted reflection. Between these partitions is an opening sufficient to accommodate the required angle of vision of the camera, indicated between the two dotted lines 6 and 7, and the required angle of illumination by the light 2, the latter being indicated by the dotted lines 8 and 9. On the far side of the partition 4 and 5, there is provided a pair of guides 10 and 11 located upon the floor, for fixing the position of the customer during the exposure. These guides will normally have elevated and curved rear portions in which the heels of the customer are fitted. A vertical post or other fixed vertical member 12, located to the rear of the customer when standing on the guides 10 and 11, is provided and a similar post 13 is located slightly to one side. These members may be of fixed height, such as six feet, or may have markings upon them at a fixed position or positions. A mirror 14 for taking a front view of the customer is provided, as well as a mirror 15 for taking a side view. As explained more fullly in connection with Figure 2, the optical distances from the camera 1 of the post 12, as seen by reflection from the mirror 15, and of the post 13, as seen by reflection from the mirror 14, are the same and, accordingly, when the picture is taken, the customer will appear upon the same scale in both front and side views, as shown in Figure 3. Moreover, posts 13 and 12 will likewise appear to the same scale, so that the picture may be projected upon a screen to life size utilizing either of the posts 12 or 13 to determine the magnification necessary. In this way, booth layouts of different dimensions may be utilized in various retail shops, and a standard projection may still be readily obtained.

As will be clear to those skilled in the art, in order to get a full front view and a true side view as shown in Fig. 3, the line OC intersects the line OB at right angles. The mirror Q then reflects a full front view, that is a front elevation, and the mirror R reflects a side view, that is a side elevation.

In addition to the front and side views already referred to, a third image will be formed directly upon the film. This image will be a three-quarters rear view and will be on a larger scale than the other views, since the optical distance to the customer measured directly to the camera is less than the optical distance by reflection from either mirror. It will be observed that by this method the front and side views, as well as the three-quarters view, are taken simultaneously so that difficulties due to change of position are eliminated and, moreover, an additional angle view is provided by means of which contours may be estimated. The expense and difficulty of operation of multiple cameras are likewise eliminated, and possible confusion among various sets of separate photographs is eliminated. From the operating point of view, the system of the invention also permits taking the pictures of successive customers on successive frames of a continuous film, so that photographically skilled personnel is not required to handle cut film or plate holders. Where desired, a second picture may be taken with the customer facing the standard 12. Such picture will provide a rear view, a second side view and a three-quarter front view. Ordinarily, such additional photograph will be unnecessary. While Figure 3 shows but a single transparency, it will be understood that the film may comprise a continuous strip or roll containing a number of such transparencies, and in particular, two or more adjacent exposures of the same customer.

The precise separation of the three images in the transparency is not critical, and some overlap may be permitted. For example, overlap of the images of the posts as between the center view and one of the side views will not be objectionable. Such overlap will constitute a double exposure, but, if the outline of the post 12 can be distinguished clearly in such double exposure, no harm will result.

In Figure 2 there is shown the central axis A and posts 12 and 13 of Figure 1, and the planes of reflection of the mirrors 14 and 15, respectively, are indicated by the letters Q and R. The distance OP from the point O on the central axis where the customer stands to the lens center P may be determined so that the angle subtended by the line joining the point O and post 13 will be about one-sixth of the angle of view of the camera, and the forty five degree view will, therefore, be included within the central third of the transparency, leaving one-third free on each side for the front and side views. The distance OP may, as suggested above, be made somewhat less and may also be made greater, resulting in a reduction of image size, but creating no interference or double exposure. In the case of a camera in which the angle of view is approximately thirty degrees, as shown in Figure 1, the distance OP may be about ten feet. The line OB may now be drawn in the direction in which the customer faces, and a point B of the reflecting surface of mirror Q determined as the point of intersection between this line and the line PB, drawn at an angle with the axis A approximately equal to one-third of the angle of view. The plane of reflection of mirror Q may now be determined by drawing a line through the point B at right angles to the bisector of the angle OBP. Due to increased optical distance, the full face view will subtend approximately the same angle as the forty-five degree view and, accordingly, the proper fitting of the image upon the film will be assured.

The plane of mirror R may now be readily established. One simple method is to establish a point C along the line through point O extending sidewise to the customer, such that the distance OCP will equal the distance OBP. The plane of reflection R of the mirror 15 may now be laid out through point C at right angles to the bisector of the angle OCP.

When the line OB makes an angle of 135° with the line OP, that is, when the angle BOP is 135°, the line OC will extend in a direction 90° from the line OB. In this special case of my invention the line OB represents a plane passing through the center of the subject parallel to the side of the subject and the line OC represents a plane passing through the center of the subject parallel to the front of the subject. The side of the subject is reflected by mirror R and the front of the subject is reflected by mirror Q, as will readily appear by reference to Figures 2 and 3. It will be noted that the plane OC is normal to the optical axis lying in the plane OB and that the plane OB is normal to the optical axis lying in the plane OC.

The mirror positions and distances may be established in various other ways and by using the posts as reference points. However, the differences involved in the picture produced will not be significant within the limits of accuracy required or utilizable for fitting clothes. Where desired, the mirror positions may be shifted, and the locations established by trial, such procedure being desirable in some cases where a restricted location requires the use of a somewhat smaller booth. Cameras having different angles of view from that shown may also be used, where necessary.

While the position in which the customer stands will normally be set at about forty-five degrees to the optical axis A, that is so that the angle BOP equals 135° this is not critical, and this angle may be varied considerably, if desired.

As will be clear from the drawing, when the planes through the subject perpendicular to the optical axes are at right angles to each other the plane for the reflection to the camera by the mirror R lies along the line BO. The plane for reflection by the mirror Q lies along the line CO. These planes intersect substantially at right angles. Slight variations in the spacing of the posts 12 and 13 will have minor effects as long as the posts are in the same plane with the point O at which the subject is placed. Similarly, slight variations in the angles of intersection of the said planes will make minor differences. It is necessary, however, that both aspects be precisely to the same scale in order that accurate measurements of the three-dimensional subject be taken from the photographic images.

A transparency produced by the foregoing method may be processed at any convenient location and projected up to full size in the manufacturer's establishment, the proper size being indicated by the length of the posts 12 and 13 as projected. A rear projection utilizing a translucent screen is preferred since measurements may be taken direct from such a projection without difficulty due to shadows falling upon the image, and a projection screen backed up with plate glass or substantial plastic is preferred so as to furnish a firm working surface for taking measurements.

The types of measurements to be taken may be classified roughly under three heads. Direct linear measurements, such as sleeve length and trouser outseam may be taken directly from the front and side view with a high degree of accuracy. Inner seam measurements may be made in a similar way or a harness, to furnish definite reference points, may be placed upon the customer while the photograph is being made. Girth measurements may be made by utilizing diameters measured off from the front and side view and then computing (or taking from a table) corresponding girth measurements. In the making of girth measurements, the forty-five degree view is of material assistance in allowing the fitter to estimate contour and musculature. The girth corresponding to given diameters or semi-diameters depends basically upon the flatness along the sides of the contour in question. For example, an oval composed of semicircular arcs bounded by straight lines will have a greater girth for the same diameters than will an ellipse. However, by selecting from among several different contour patterns and utilizing that pattern corresponding most closely to the individual for computing the girth from the diameters, it is possible to make girth measurements which will be sufficiently accurate for high quality tailoring, and more accurate than those made with tapes by present methods. Instead of utilizing angle views for selecting contour patterns, measurements taken from one or more angle views may be utilized along with the diametral measurements in calculating girth.

Where desired, measuring tapes may be positioned on the customer so that the tape measurements may be included in the views. It is well known that different tailors measuring the same person frequently state different measurements, due to different positioning of the tape and different tension. The photographing of the tapes in position permits allowance for such factors to be made by highly skilled personnel from the information afforded by the photograph. The customer may be photographed in shirt and trousers or in underwear or other garments and more than one photograph in different clothes may be taken. In particular, the method of the invention may be combined very advantageously with the now known method of fitting in which the customer is fitted as closely as possible with a sample suit and then the suit is cut specially according to the alterations indicated with reference to the sample. This method possesses the very considerable advantage that a full line of sizes and half sizes in basic styles may be carried in a single pattern, since the samples are not sold to the customer but are used only to facilitate measurements and need not be carried in more than one cloth. By photographing the customer in the most closely fitting suit of such a set of standard samples, or utilizing such a photograph in conjunction with one or more photographs of the type above mentioned, the photograph may be related not only to the actual measurement but also to the difference between such measurements and those of a standard pattern so that the best possible fit with the least expenditure of time in the original fitting and in alteration may be had. The standard suit may also carry a tag or other indication indicating definitely the size and style, eliminating a possible source of error.

Instead of, or in addition to, the photographing of the customer in the best fitting garment of a set of standard samples, comparison may be made during the projection of the photograph with projections of persons or dummies representing physiques fitted perfectly by the standard patterns. It should be noted that this process does not involve any attempt to compare the customer himself in outline with a standard pattern, such comparison being difficult, if not impossible, due to the tendency of the customer to move and the impossibility of getting the entire body into proper position for comparison with such pattern. Also, it is highly desirable that the measurements and comparisons be made, not in the retail shop by relatively unskilled personnel, but in the manufacturer's establishment by highly skilled personnel. Utilizing the transparency and method of the present invention, all that is required is a set of standard transparencies made from persons or dummies fitted by various styles and sizes and the projection of one of these transparencies along with the photograph of the customer to be fitted. Since projection to the same scale may automatically be assured and since comparison may be made dimension by dimension by shifting the relative positions of the two projections, and thus superposing where desirable, a very accurate comparison may be made.

As will now be apparent to those familiar with the tailoring of clothes, a very simple and reliable apparatus and method have been provided for eliminating errors in fitting due to lack of skill of those taking measurements or due to differences in the measurements taken even by highly skilled personnel. It is a known fact that measurements taken by the most skilled tailors vary widely, so that reliability and uniformity in measurement requires not only skill but standard conditions and the elimination of individual judgment in the measurements. By the foregoing apparatus and methods, these desirable results are achieved, and in a simple and economical way.

What is claimed is:

1. A method of taking measurements of a three-dimensional subject having a front, back and sides, including the steps of positioning the subject intermediate a pair of reflecting surfaces, positioning an object of known dimensions in a plane parallel to the side of the subject, positioning an object of known dimensions in a plane parallel to the front of the subject, which planes intersect at the center of the subject, adjusting the surfaces and the objects in such a manner that the reflected distances to a common point of intersection of the optical paths from the center of the subject and one object by way of one reflecting surface are equal, respectively, to the reflected distances from the center of the subject and the other object by way of the other reflecting surface, positioning a camera at such point and exposing a photosensitive medium in said camera whereby to make a photograph of two aspects of the subject to the same scale by a single exposure and then taking desired measurements of the subject.

2. A method of taking measurements of three-dimensional subject, having a front, back and sides, including the steps of positioning the subject intermediate a pair of reflecting surfaces, positioning fixed height means in a plane parallel to the side of the subject and in a plane parallel to the front of the subject, which planes intersect at the center of the subject, adjusting the surfaces and the height means in such a manner that the reflected distance to the common point of intersection of the optical paths from the center of the subject by way of one reflecting surface is equal to the reflected distance from the center of the subject to the common point of intersection by way of the other reflecting surface, and the reflected distance of said height means by way of one reflecting surface to the common point of intersection is equal to the reflected distance of said height means to the common point of intersection by way of the other reflecting surface, positioning a camera at such point and exposing a photo-sensitive medium in said camera whereby to make a photograph of two aspects of the subject to the same scale by a single exposure and then taking desired measurements of the subject.

3. A method as in claim 2 in which said measuring step includes projecting the photograph to a predetermined scale by rear projection.

HENRY BOOTH.

REFERENCES CITED

The following references are of record in the file of this patent:

UNITED STATES PATENTS

| Number | Name | Date |
| --- | --- | --- |
| 505,127 | Ranger | Sept. 19, 1893 |
| 647,608 | Pietzner | Apr. 17, 1900 |
| 1,324,887 | Folmer | Dec. 16, 1919 |
| 1,391,807 | Swalm et al. | Sept. 27, 1921 |
| 1,414,481 | Moe | May 2, 1922 |
| 1,427,615 | Merriam | Aug. 29, 1922 |
| 1,937,433 | Moe | Nov. 28, 1933 |
| 2,006,774 | Ohlsson | July 2, 1935 |
| 2,055,118 | Carpenter | Sept. 22, 1936 |
| 2,072,084 | Carey | Mar. 2, 1937 |
| 2,085,400 | Tomozawa | June 29, 1937 |
| 2,192,529 | Thomas | Mar. 5, 1940 |
| 2,223,849 | Fogler | Dec. 3, 1940 |
| 2,232,032 | Kroner | Feb. 18, 1941 |
| 2,345,225 | Walsh | Mar. 28, 1944 |
| 2,381,634 | Back | Aug. 7, 1945 |
| 2,386,276 | Simjian | Oct. 9, 1945 |
| 2,406,451 | Borkenstein | Aug. 27, 1946 |

FOREIGN PATENTS

| Number | Country | Date |
| --- | --- | --- |
| 370,820 | France | Feb. 20, 1907 |
| 572,717 | Germany | Jan. 20, 1934 |
| 783,320 | France | Apr. 1, 1935 |

OTHER REFERENCES

Publ., Scientific American, May 14, 1910, vol. 102, pp. 393, 394.

Publ., Scientific American, June 1, 1912, vol. 106, pp. 496, 497.